United States Patent [19]

Zurbuchen et al.

[11] Patent Number: 5,394,773
[45] Date of Patent: Mar. 7, 1995

[54] COMPOSITE HAND TOOL

[75] Inventors: Gregory A. Zurbuchen, Kenosha; Paul M. Machmeier, Racine, both of Wis.

[73] Assignee: Snap-on Incorporated, Kenosha, Wis.

[21] Appl. No.: 153,756

[22] Filed: Nov. 17, 1993

Related U.S. Application Data

[62] Division of Ser. No. 913,221, Jul. 14, 1992, Pat. No. 5,271,300.

[51] Int. Cl.$^6$ ............................................. B25B 13/06
[52] U.S. Cl. ..................................... 76/114; 76/119; 428/114
[58] Field of Search ................ 76/114, DIG. 7, 119, 76/101.1; 81/124.4, 900; 428/114, 298, 303

[56] References Cited

U.S. PATENT DOCUMENTS

| | | | |
|---|---|---|---|
| 2,720,799 | 10/1955 | Pfost | 76/114 X |
| 2,940,492 | 6/1960 | Curry et al. | 145/61 |
| 3,691,000 | 9/1972 | Kalnin | 428/114 |
| 3,889,035 | 6/1975 | Jakes | 428/227 |
| 4,992,318 | 2/1991 | Gadkarer | 428/298 X |
| 5,062,328 | 11/1991 | Demurger | 81/186 |
| 5,227,216 | 7/1993 | Pettit | 428/298 |

FOREIGN PATENT DOCUMENTS

2018179  10/1979  United Kingdom ................. 76/114

Primary Examiner—Douglas D. Watts
Attorney, Agent, or Firm—Emrich & Dithmar

[57] ABSTRACT

A totally non-metallic wrench formed entirely of fiber-reinforced plastic material includes a core of random discontinuous glass-fiber-reinforced plastic material and a band of unidirectional continuous glass-fiber-reinforced plastic material extending around the periphery of the core which are subjected to compression molding to form a composite wrench structure.

14 Claims, 9 Drawing Sheets

COMPOSITE HAND TOOL

This is a divisional of application Ser. No. 07/913,221, filed Jul. 14, 1992, now U.S. Pat. No. 5,271,300.

BACKGROUND OF THE INVENTION

This invention relates to hand tools and the like, and more particularly, to a composite hand tool which is made entirely of different types of glass-reinforced plastic material.

Conventionally, wrenches and similar hand tools have been made of iron, steel, or some other metal, because of strength and durability requirements. Metal tools are manufactured using casting or forging procedures. An important disadvantage of metal tools is their cost, both from manufacturing and material standpoints. Moreover, metal tools are unsuitable for use in many applications, particularly when a shock hazard condition exists.

Hand tools have been proposed which include both metal and plastic, the plastic generally forming the handles, or lower-stress receiving portions of the tool. Although this results in reduced cost from a material standpoint, the presence of metal limits use of the tool. Some hand tools have been proposed which are made entirely of a plastic material. However, such hand tools have found limited application because of strength requirements for the work receiving portions of the hand tool. Accordingly, for the most part, the use of plastic in tools has been limited to low-torque wrenches and low-strength pliers, and the like, where high-stress factors are not encountered in use.

Box-end wrenches, both flat and offset, which have been produced by Bonzai, Ltd. of Tokyo, Japan, have a handle formed of unidirectional carbon-fiber epoxy tape with the exterior surfaces covered by a single ply of plain-weave, carbon-fiber epoxy fabric. However, to withstand high local contact stresses, the box end of the flat wrench includes a steel insert which forms the double hex drive configuration for the wrench. The steel hex insert has a plurality of plies of unidirectional tape wrapping the outer diameter of the insert body. The steel insert is attached to the wrench body by a plurality of pins. It was found that using a steel-insert construction results in brittle fiber failure, fiber pullout and matrix delamination during loading. Moreover, the offset box-end wrench yielded less than 40% of the torque strength of its metal equivalent because of low interlaminar shear strength. In addition, the presence of carbon fibers is undesirable because of their inherent conductivity.

In U.S. Pat. No. 5,062,328, there is disclosed an open-ended wrench having a body made of glass-fiber-reinforced plastic material with a gripping head having a polygonal opening in which there is embedded a metal insert of hard steel with a polygonal opening to bear high contact stresses during use of the wrench. The wrench requires a metal insert to withstand the gripping stresses which are exerted at the point of contact between the jaw of the wrench and a nut being turned by the wrench.

There is a need for wrenches and other hand tools which are non-metallic and therefore nonmagnetic, nonconductive and non-sparking, which are made of low cost materials, and which are inexpensive to manufacture, but yet have strength comparable to that of a metal tool of comparable size.

SUMMARY OF THE INVENTION

The present invention provides a totally non-metallic hand tool formed entirely of plastic material containing discontinuous glass-fiber reinforcement disposed in random orientation and continuous glass-fiber reinforcement disposed in a controlled orientation. The present invention further provides a hand tool comprising a core of random discontinuous glass-fiber-reinforced plastic material and a band of unidirectional continuous glass-fiber-reinforced plastic material extending around the periphery of the core.

In accordance with a further aspect of the invention, there is provided a method of making a composite hand tool comprising the steps of preparing a plurality of layers of a random discontinuous glass-fiber-reinforced plastic material having the shape of the outline of the hand tool, stacking the layers together to form a core for the hand tool, placing a band of unidirectional continuous glass-fiber-reinforced plastic material in the core to provide a mold charge and subjecting the mold charge to heat and pressure in a compression molding apparatus for a predetermined interval of time to form a composite hand tool structure.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
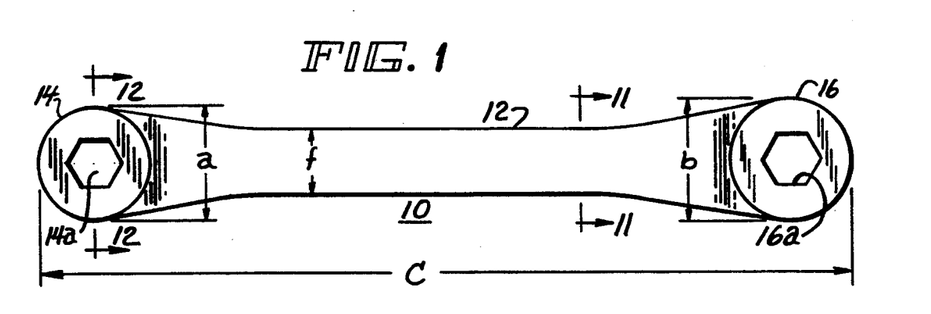
FIG. 1 is a top plan view of a composite double-ended box wrench provided by the present invention.
Figure 2:
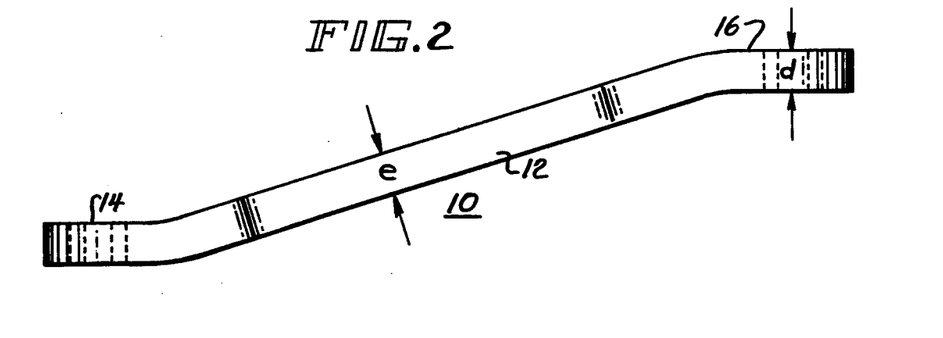
FIG. 2 is a side view of the wrench shown in FIG. 1.

Referring to FIGS. 1 and 2, there is illustrated a composite double-ended box wrench 10 provided by the present invention. The wrench 10 includes an elongated handle portion 12 and box-head ends 14 and 16 of different sizes at opposite ends. The wrench 10 is formed entirely of different types of glass-fiber-reinforced plastic material and is produced using a compression molding process. Although for purposes of illustration, the invention is described with reference to a double-ended box wrench, the principles of the invention are applicable to other hand tools and the like, such as open-ended wrenches, pliers, drivers, ratchets, sockets, etc.

In the particular embodiment depicted, wrench 10 has an offset end configuration with each of the box-head ends 14 and 16 being offset 15° relative to the axis of the handle portion 12. The offset allows for more freedom and comfort of use as is known. The wrench 10 has strength and dimensions similar to those of a steel double ended box wrench and a set of such wrenches has been produced having conventional wrench-size combinations such as ½, 9/16; ⅝, 11/16; ¾, 13/16; ⅞, 15/16 and 1, 1-⅛ inches.

For purposes of illustration, one embodiment of a double-ended box-head wrench 10 produced in accordance with the present invention was a ¾, 13/16 inch combination 7rench. The wrench 10 had end diameters "a" and "b" of 1.535 inches and 1.655 inches, respectively. The handle length "c" was 11.10 inches. The thickness "d" of the box end was 0.563 inch. The handle thickness "e" was 0.52 inch. The handle width "f" was 0.85 inches. Each of the box-head ends 14 and 16 of the wrench 10 had a hex configuration.

Figure 3:
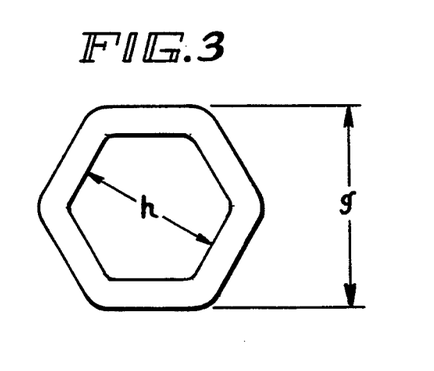
FIG. 3 is a top plan view of a premolded hex insert which can be incorporated into the box area of the wrench shown in FIG. 1.

The box-head interior hex configuration can be provided by a premolded insert 20, shown in FIG. 3. The premolded insert 20 can be incorporated into the interior box area of the wrench 10 during the molding procedure as will be described. The insert 20 is compression molded from the random-fiber-reinforced material that is used for the core of the wrench 10. The insert 20 for the ¾ inch wrench may have an overall width "g" of 1.065 inch and a distance "h" of 0.758 inch between opposing inner wall surfaces. The height or thickness of the insert is the same as that for the box-head end.

The wrench 10 is compression molded entirely from glass-fiber-reinforced thermoset polymer matrix sheet molding compounds. The glass-fiber reinforcement is utilized in both chopped or discontinuous random form and in continuous unidirectional form. Preferably, the thermoset polymer matrix molding material is vinyl ester because this material offers significant processing advantages including fast cure rate and high workability. However, the wrench 10 could be made of glass-fiber-reinforced epoxy materials or other plastics.

The material used for the body or core of the wrench is a chopped random-oriented glass-fiber-reinforced vinyl ester material, hereinafter referred to as random-fiber-reinforced material. The wrench 10 further includes a reinforcement portion which extends around the periphery of the wrench and which is made of a unidirectional continuous glass-fiber-reinforced vinyl ester material, hereinafter referred to as unidirectional-fiber-reinforced material. These compounds contain a styrene monomer cross-linking agent. When used together in the composite wrench, the two compounds complement each other. The random-fiber-reinforced material which forms the bulk of the wrench structure insures that an adequate level of isotropy exists in order to handle multi-directional loading. The unidirectional-fiber-reinforced material allows for tailoring of local and direct strength and stiffness within the wrench structure. The cost of the random-fiber-reinforced material is considerably less than that of the unidirectional-fiber-reinforced material. Materials suitable for this application are commercially available from Quantum Composites, Inc., Midland, Mich. 48640 under the catalog numbers QC-8500, which is a chopped random one-inch glass-fiber-reinforced vinyl ester sheet molding compound, and QC-8505, which is a unidirectional continuous glass-fiber-reinforced vinyl ester sheet molding compound. Both materials are produced in sheet-like form approximately ⅜ inch thick.

The weight percent of glass fiber in the random-glass-fiber-reinforced plastic material is approximately 56% The weight percent of glass fiber in the unidirectional continuous glass-fiber-reinforced plastic material is approximately 65%. The random-glass-fiber-reinforced plastic material includes glass fibers having a diameter in the range of 0.0005 inch to 0.0007 inch and the unidirectional glass-fiber-reinforced plastic material includes glass fibers having a diameter in the range of 0.0006 inch to 0.0013 inch. As will be shown, the main body or core of the wrench 10 is made from a plurality of layers of the random-fiber-reinforced material. However, the finished molded product is ostensibly a single layer composite containing both discontinuous-fiber reinforcement in random orientation and continuous-fiber reinforcement in a controlled orientation, the controlled orientation being provided by using continuous unidirectionally oriented glass-fiber-reinforced plastic material and positioning the material, in strip form, in the core prior to molding.

Because the plastic materials used to make the composite wrench 10 include no metallic components, the wrench 10 is nonconductive, nonmagnetic and non-sparking. Also, the wrench 10 is corrosion resistant, nonmarring and lightweight.

The wrench 10 is compression molded using compression molding apparatus including a hydraulic press. The materials used in making the wrench 10 can be molded over a range of temperatures and pressures. The sheet molding compounds are urethane thickened and provide fast molding cycles. The specific molding temperature, pressure, and the cycle or cure time for the composite wrench vary according to part size and mold charge placement. Generally, for a part thickness of 0.5 inch or less, the molding temperature used is in the range of about 250° to 340° F. and the molding pressure is in the range of about 500 psi to 1,500 psi. The molding temperature is reduced for a part thickness greater than 0.5 inch. Cure or cycle time depends on the molding temperature and the thickness of the part being molded. A typical cure time for a ¾", 13/16" composite box wrench 10 having the dimensions indicated herein, and in particular a box-end thickness of 0.563 inch, is about eight minutes.

Before the wrench can be molded, a mold charge must be created. The mold charge is the material placed in the mold for each cycle. The characteristics of the mold charge include weight, shape, and relative placements of the materials used. The following details of the wrench mold charge are critical to the production of the composite wrench: 1) the placement of the materials in the mold; 2) the size and shape of the wrench being molded; 3) the amount of material used; and 4) the position of the material in the mold and during the molding process.

Figure 4:
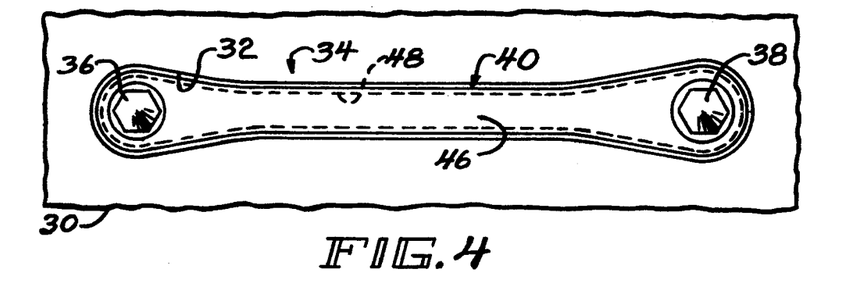
FIG. 4 is a top plan view of a simplified representation of a mold illustrating the arrangement in the mold of component materials which form a charge of fiber glass reinforced material for the composite wrench provided in accordance with the present invention.
Figure 5:
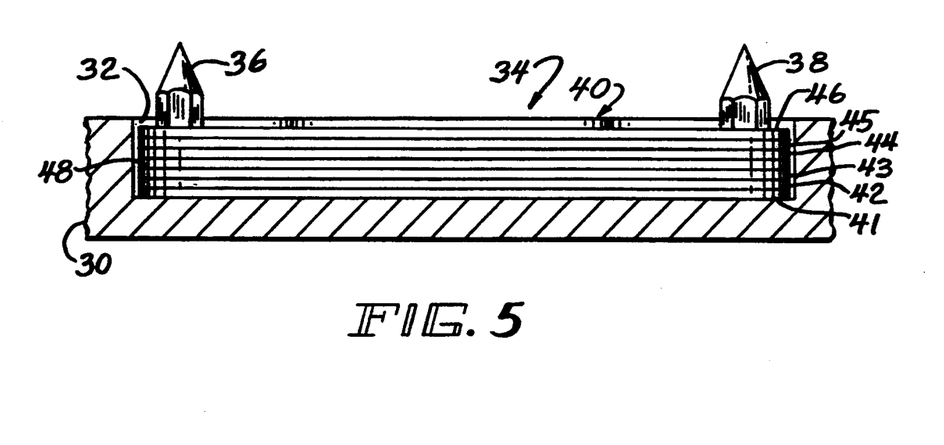
FIG. 5 is a side view of the mold shown in FIG. 4, illustrating the layered arrangement of the charge of fiber glass reinforced material.

Referring to FIGS. 4 and 5, there are illustrated top and side views, respectively, of a simplified representation /f a mold 30 having a mold cavity 32, illustrating the composition of the mold charge 34 and the placement of the mold charge in the mold cavity 32. The mold charge 34 is slightly smaller than the outline of the wrench defined by the mold cavity to permit the mold charge to lie flat in the mold cavity. The mold charge is placed over a pair of core pins 36 and 38 which define the open box-head ends 14 and 16 of the molded wrench 10 shown in FIG. 1 The mold charge 34 includes a core 40, which, in an exemplary embodiment is comprised of six layers 41–46 of the random-fiber-reinforced material which are stacked on top of one another. The mold charge 34 may include more than six layers or less than six layers of the random-fiber-reinforced material, depending upon the size of the wrench being molded. A band 48 of the unidirectional-fiber-reinforced material is inserted between certain layers, such as layers 43 and 44, of the wrench core 40 and extends around the periphery of the wrench core 40.

This band 48 greatly increases the strength of the molded wrench 10, shown in FIG. 1, by carrying the majority of the box-wall hoop stress and the flexural stress placed on the handle 12 of the wrench 10 in use. The relative size, shape and position of the band 48 of unidirectional-fiber-reinforced material, prior to the molding operation, is illustrated in FIGS. 4 and 5.

Figure 12:
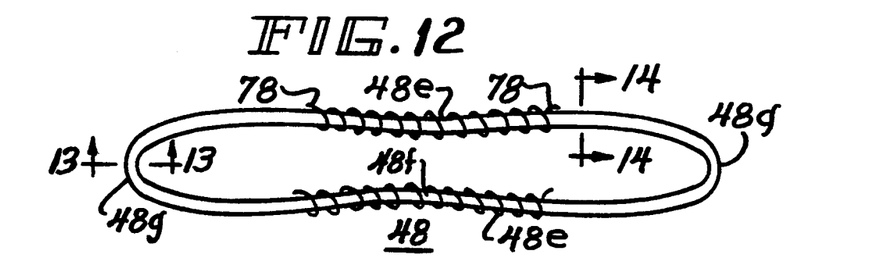
FIG. 12 is a top plan view of the band of unidirectional-fiber-reinforced material.
Figure 13:
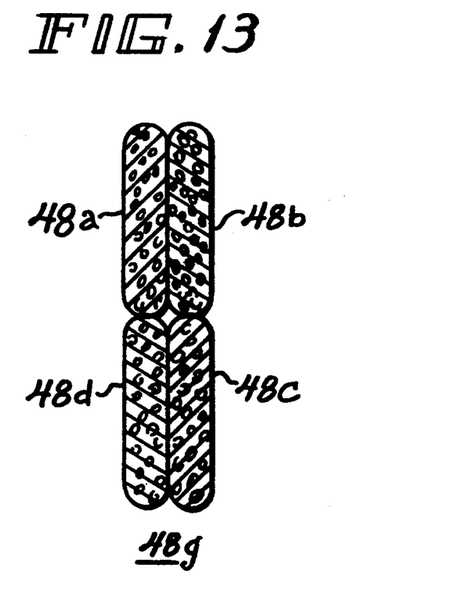
FIG. 13 is a vertical section view taken along the line 13—13 of FIG. 12.
Figure 14:
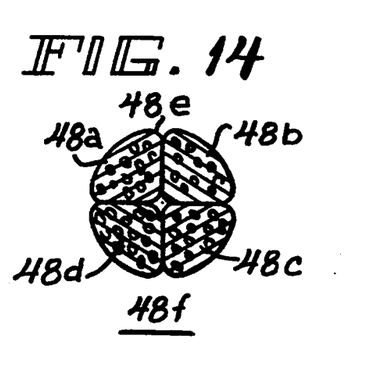
FIG. 14 is a vertical section view taken along the line 14—14 of FIG. 12.

Referring to FIGS. 4, 5 and 11-14, the band 48 is formed from a plurality of strips 48a–48d of the unidirectional fiber-reinforced material and is generally rectangular in cross section in the box-head end portion 14, as shown in FIG. 13, and is generally circular in cross section in the handle portion 12, as shown in FIG. 14. The thickness of the band 48 is generally equal to the thickness of one to two layers 41–46. The band 48 is positioned to extend along the entire periphery of the core 40. The length of the band 48 corresponds to the length of the periphery of the core 40. The length of the band 48 is critical. If the band 48 is too long, the resulting slack is deleterious. If the band 48 is too short, the material will pinch the core pins 36 and 38 during molding and the band material will not remain at the outer peripheral edge of wrench core 40 where the stress levels are higher in use. The length of the band 48 is selected to encompass the wrench core 40, with the outer edge of the band 48 substantially flush with the side surface of the peripheral edge of the wrench core 40 as illustrated in FIG. 4. For an exemplary double-ended wrench 10 which was 11.10 inches in length and had box end diameters of 1.535 inches, the length of the band 48 was approximately 25 inches. It is pointed out that for a single-ended wrench, the band 48 may be U-shaped, enclosing only the working end of the wrench and extending along approximately two-thirds the length of the handle portion of the wrench.

Figure 4A:
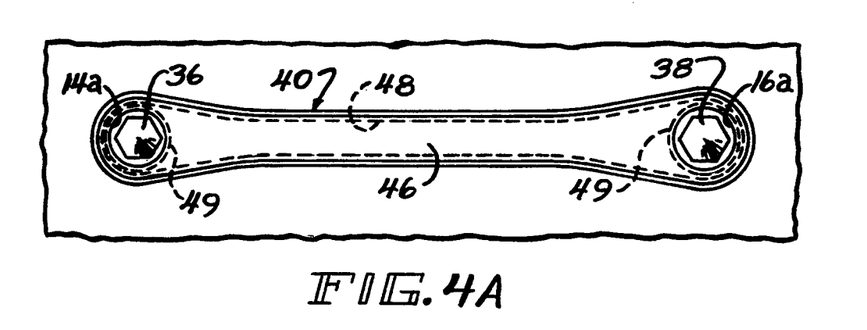
FIG. 4A is a view similar to FIG. 4, but illustrating placement of fiber glass reinforced material in the box-head ends of the wrench.

Referring to FIG. 4A, a small strip or band 49 of unidirectional-fiber-reinforced material may be looped around the interior walls of the box openings 14a and 16a in the layers 41–46 which constitute the wrench core 40 to add reinforcement to the box ends.

Figure 6:
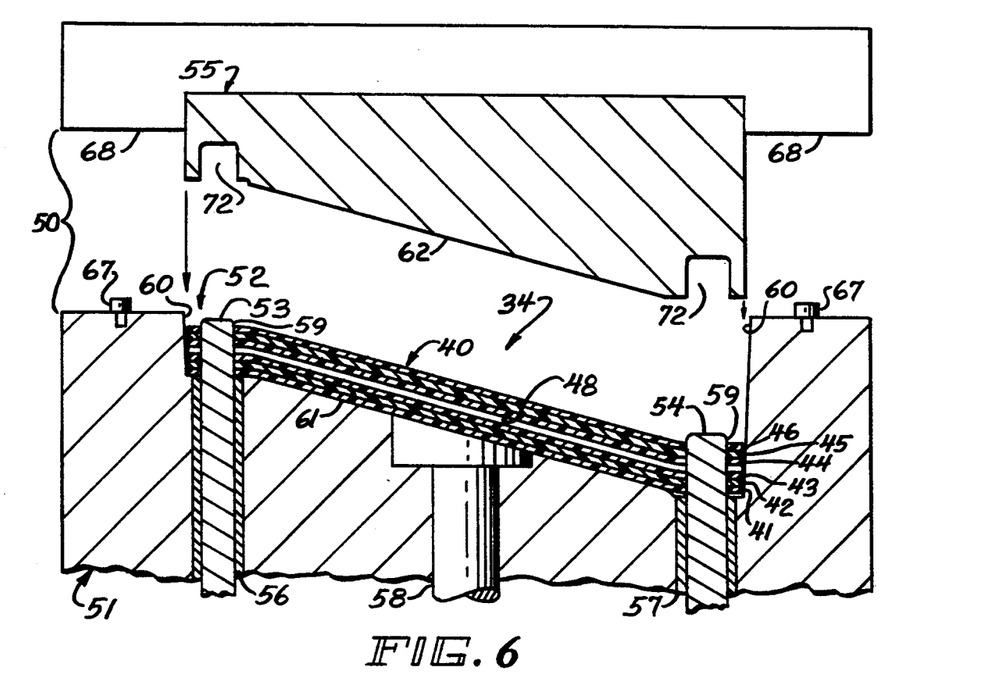
FIG. 6 is a simplified representation of compression molding apparatus illustrating a mold charge positioned in the open mold prior to the molding operation.

Referring to FIG. 6, there is illustrated a simplified representation of compression-molding apparatus for producing the composite wrench 10 provided by the present invention. The molding apparatus includes a mold 50 having a mold body 51 defining a mold cavity 52, core pins 53 and 54 and a ram 55. The core pins 53 and 54 are stationary and hollow cylindrical ejector sleeves 56 and 57, which are slidably mounted on the outer surface of the core pins 53 and 54, respectively, and ejector bar 58 which communicates with the mold cavity 52, facilitate ejection of a molded wrench from the mold 50 after completion of the molding process. FIG. 6 illustrates the molding apparatus in its open condition with the mold charge 34 received in the mold cavity 52. The mold charge 34 includes a wrench core 40 including six layers 41–46 of random-fiber-reinforced material and a band 48 of unidirectional-fiber-reinforced material. The mold charge 34 is positioned in the mold cavity with its looped ends placed over the core pins 53 and 54 which define the open box ends of the molded wrench. The mold cavity 52 is shaped to the outline of the wrench being molded. Thus, a portion 61 of the bottom wall /f the mold cavity 52 is inclined at an angle of 15° to define the offset end configuration for the wrench. The ram 55 cooperates with the mold cavity and has a lower surface 62 shaped to define the outline of the upper surface of the wrench. The inner wall 60 of the mold cavity tapers outwardly to provide draft for each charge placement. The core pins 53 and 54 each have a hexagonal outer surface 59 which defines the shape of the box-head ends of the wrench. The surfaces 59 cooperate with the opposing surface of the mold cavity inner wall 60 to capture and hold the band 48 of unidirectional-fiber-reinforced material. The mold body 51 has a plurality of stop pins 67 which cooperate with the lower surface 68 of ram 55 to limit travel of the ram 55 relative to the mold body when the mold is operated to its closed condition.

Figure 7:
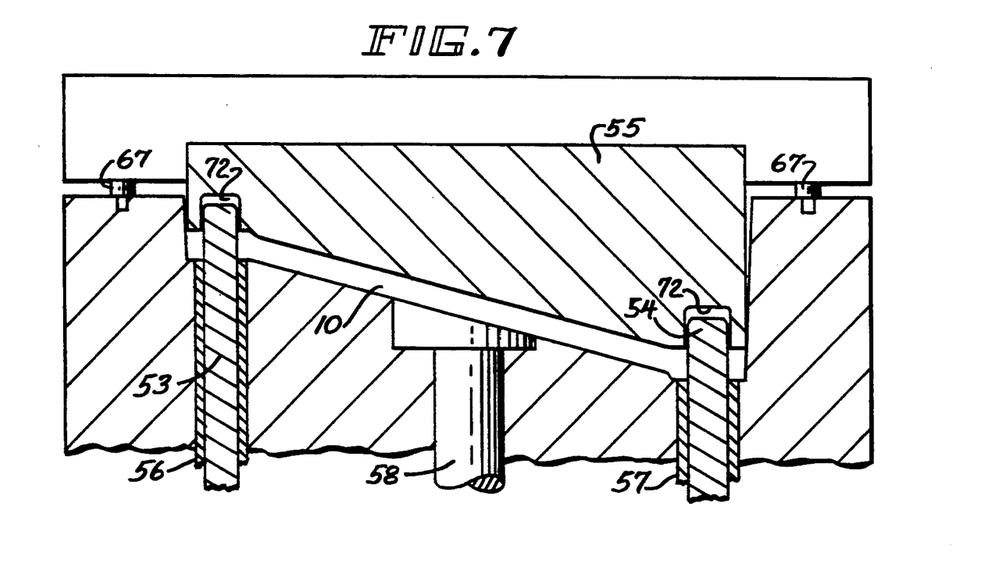
FIG. 7 illustrates the mold closed during the compression molding operation.

Referring to FIG. 7 which illustrates the mold 50 in its closed condition during the compression-molding operation, the ram 55 defines two core-pin receiving cavities 72 on its inner surface. The cavities provide a space between the inner surface of the ram 55 and the core pins 53 and 54 when the mold is closed. The cavities provide clearance for flash build-up that may occur during the compression-molding operation.

Figure 8:
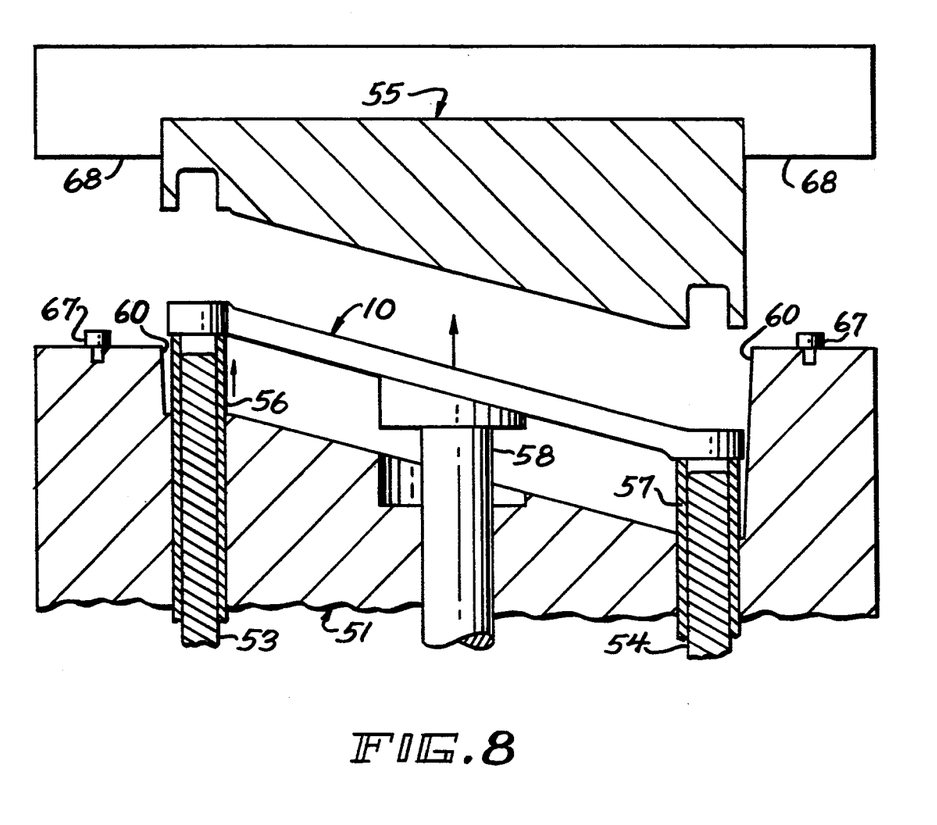
FIG. 8 illustrates the ejection of the composite wrench from the mold after completion of the compression molding operation.

FIG. 8 illustrates the mold 50 in its open condition, following the molding operation, and with the ejector pins 56–57 and ejector bar 58 extended to eject the composite wrench 10 from the mold.

Figure 9:
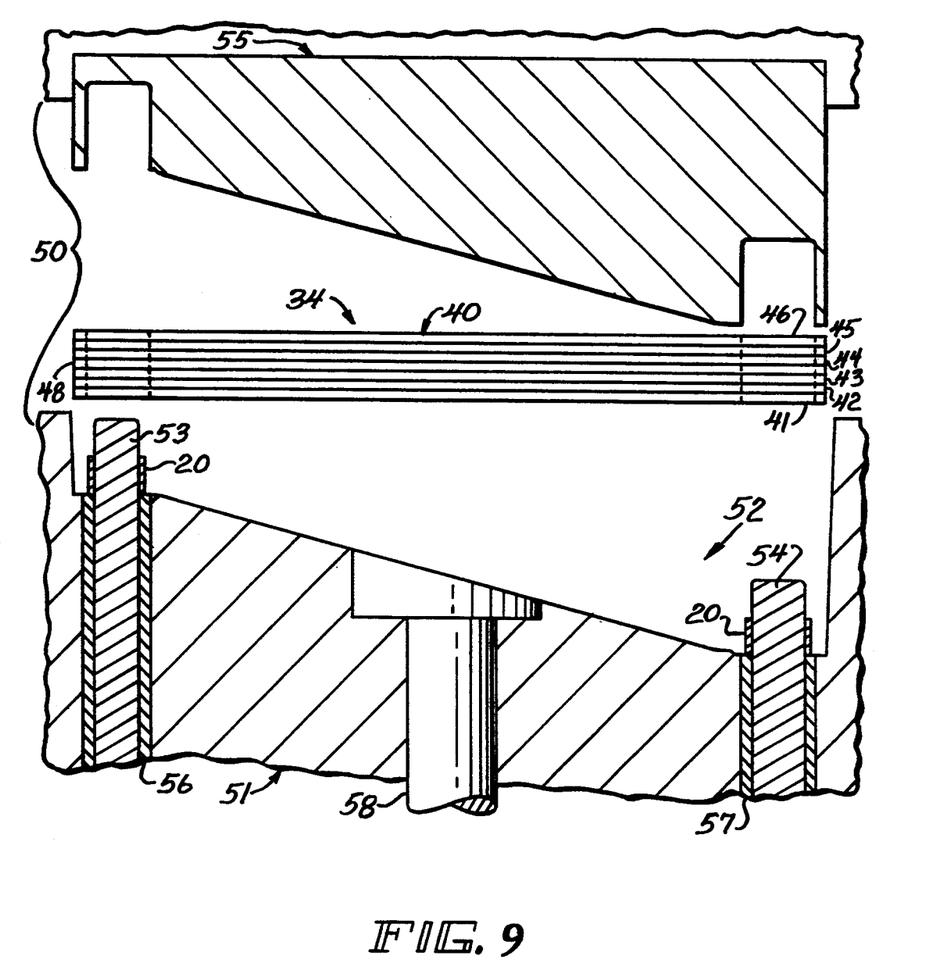
FIG. 9 illustrates the compression molding apparatus prior to charging with mold charge, and showing premolded inserts positioned in the mold cavity.
Figure 9A:
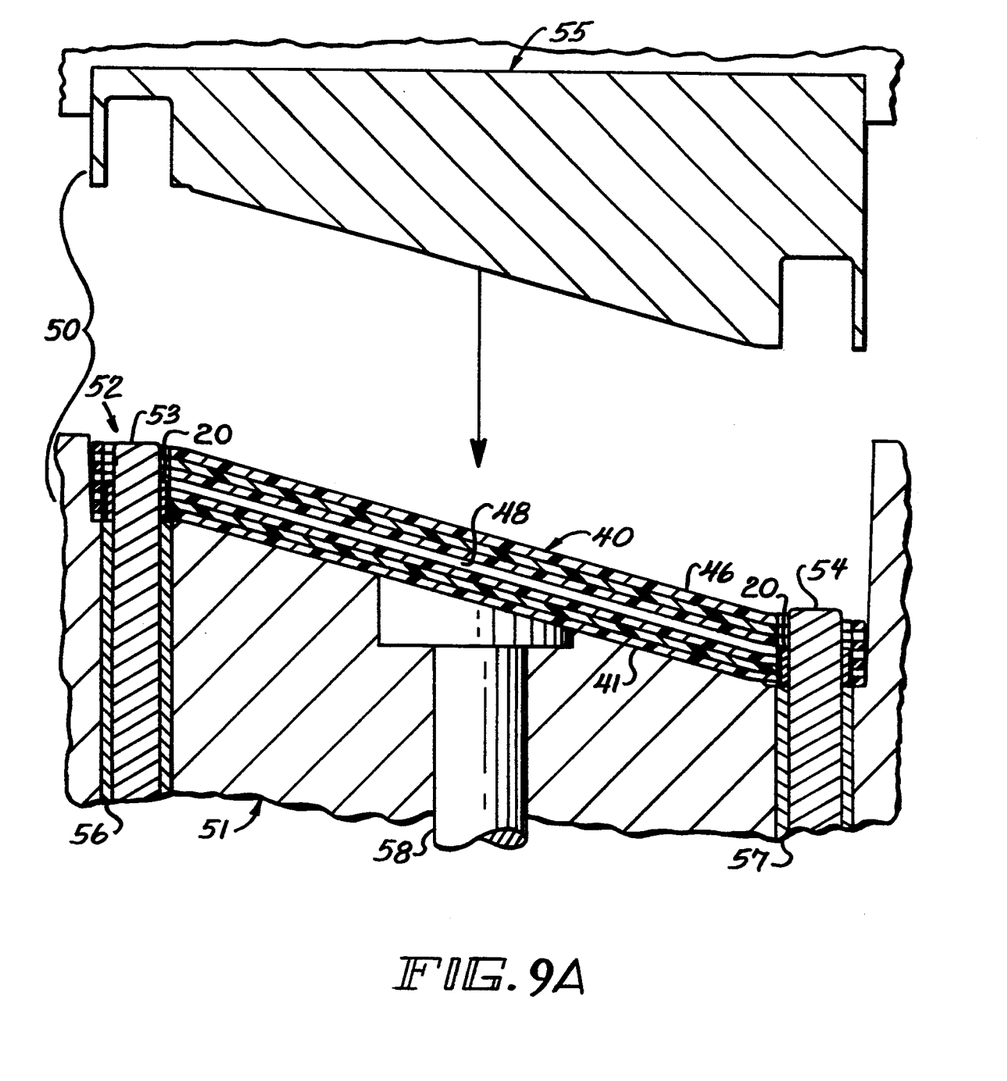
FIG. 9A is a view similar to FIG. 9, but illustrating the mold charge positioned in the mold cavity and over the premolded inserts.

Referring to FIGS. 3, 9 and 9A, the molding of the premolded inserts 20 into the interior of the box-head portions of the composite wrench 10 will now be described. FIG. 9 illustrates the compression mold 50 in its open condition, prior to being charged with the mold charge 34. The inserts 20 are positioned on the core pins 53 and 54 prior to charging the mold 50 with the mold charge 34. When the inserts are in place in the mold cavity, the mold charge 34 is positioned in the mold cavity 52 and looped over the inserts 20.

After the mold charge 34 has been positioned in the cavity 52. The mold 50 is operated to its closed condition, subjecting the mold charge therein to heat and pressure to mold the inserts 20 into the composite wrench body.

Figure 10:
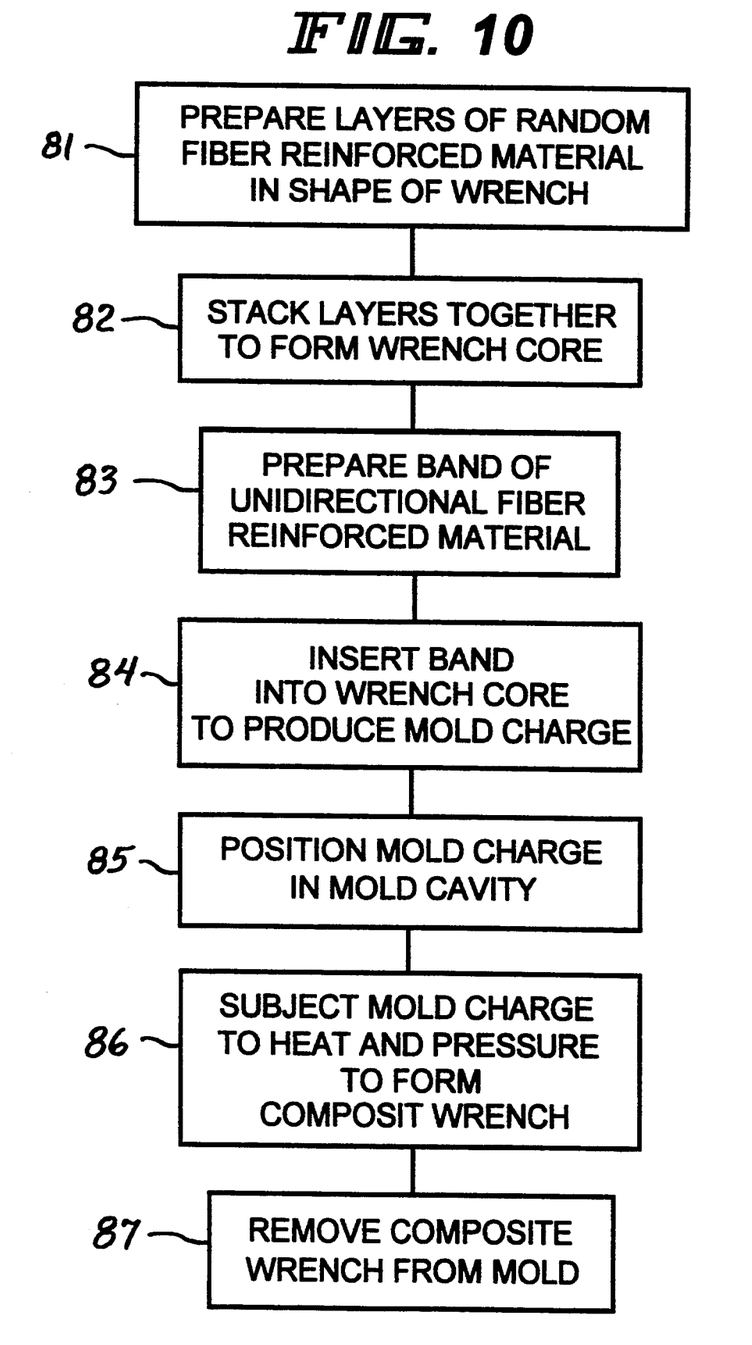
FIG. 10 is a process flow chart illustrating the steps in the process of producing the composite wrench in accordance with the present invention.
Figure 11:
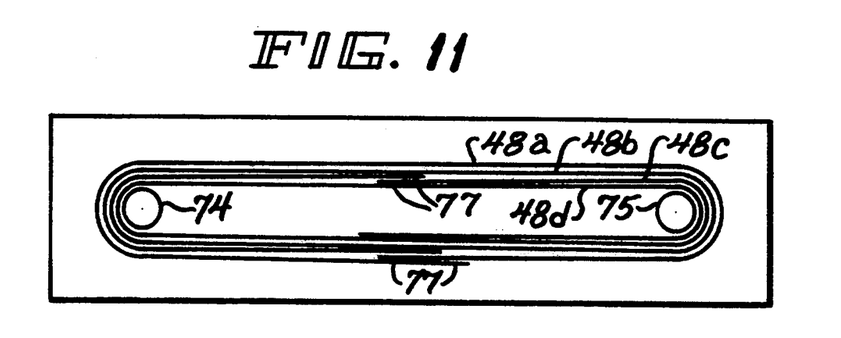
FIG. 11 illustrates a plurality of strips of continuous unidirectional-fiber-reinforced material wrapped around pins of a wrapping fixture to form the band which extends around the periphery of the wrench core as shown in FIG. 4.

Referring to FIG. 10, there is illustrated a process flow chart illustrating the steps of making the composite wrench 10 in accordance with the present invention. At the first step of the process, block 81, the mold charge is created by preparing a plurality of layers of random-fiber-reinforced material in the shape of the outline of the wrench.

Referring additionally to FIG. 6, a steel rule die (not shown) is used to cut from sheets of random-fiber-reinforced material ⅛ inch thick, the six layers 41–46 needed to form the wrench core 40. The forms are cut to the shape of the outline of the wrench, slightly undersized to allow the layers 41–46 to be easily placed flat within the mold cavity 52. Then, at the next step of the process, block 82, the six layers 41–46 are stacked on top of one another to form the core 40 of the wrench.

Then, at block 83, the strip or band 48 of unidirectional continuous fiber reinforced material is prepared. Preferably, the band 48 is made from a plurality of strips or ribbons 48a, 48b, 48c and 48d of the unidirectional fiber-reinforced material. However, the band 48 can be made from a single long strip of the unidirectional-fiber-reinforced material which is wrapped on itself, forming a plurality of loops. For purposes of illustration, the band 48 is illustrated as comprising four such strips 48a–8d, or four loops of a single strip. However, more or fewer strips or loops could be used, depending on the size of the band required for a particular application.

Referring to FIGS. 1 and 11–14, the unidirectional-fiber-reinforced material is cut into long strips or ribbons 48a, 48b, 48c and 48d approximately ⅛" by ¼" in cross-section which are wrapped together to form the band 48. The four strips 48a–8d are wrapped around the posts 74 and 75 of a wrapping fixture 76, forming four loops. The four strips are consolidated into a single unit to form the band 48. The strips 48a–8d are wound around posts 74 and 75 so that the ends 77 of the strips are located in the portion of the band 48 that will be located in the handle of the composite wrench. The loose ends 77 of the strips 48a–8d are bound together in the band by short segments 48e of the strip material. The segments 48e are spirally wrapped on the consolidated strips, as illustrated in FIG. 12. The spiral wraps 48e are held in place by tucking the ends 78 under the outermost turns of the wrap. The four loops are disposed generally side-by-side. As illustrated in FIG. 14, the portion 48g of the band 48 which is included in the handle has a generally circular cross section and having a diameter of about 0.25 inch. As illustrated in FIG. 13, the portions 48f of the band 48 which are included in the box-head-ends have a generally rectangular cross-section which is about 0.15 inch by 0.65 inch, due to the force of wrapping the ribbons 48a–8d around the pins 74 and 75 of the wrapping fixture 76.

Referring to FIGS. 4, 5 and 10, at block 84, the band 48 is inserted between layers 43 and 44 of the die cut sections or layers 41–46. This step of the process is performed during the stacking of the layers 41–46 on top of one another. That is, the band is placed on the top of layer 43, prior to stacking layer 44 on layer 43. Strips or bands 49 of unidirectional-fiber-reinforced material may be looped around the box openings in the die cut sections or layers 41–46 and inserted between layers 43 and 44, as shown in FIG. 4A, to provide additional reinforcement to the box-head ends. The strips or bands 49 are placed on layer 43 as the stack of layers 41–46 is being formed.

After the wrench core layers 41–46 have been stacked together with the band 48, the weight, that is the amount of material, of the mold charge 34 is brought up to the level necessary to properly fill the mold cavity 52. This is done by adding partial sections of die-cut random-fiber-reinforced material to produce a full mold charge weight. That is, after the layers 41–46 have been stacked together with the band 48 (and band 49), the mold charge 34 is weighed and partial sections of the random-fiber-reinforced material are added to the top of the stack. A maximum number of complete layers is always used before adding partial layers made from pieces of die cut sections to fill out the mold charge.

With continued reference to FIGS. 6 and 10, after the charge components have all been consolidated, then in the next process step, block 85, the mold charge 34 is positioned in the mold cavity 52. The mold charge 34 is placed over the core pins 53 and 54 and lowered into the mold cavity 52 and positioned to lay flat in the mold cavity, as shown in FIG. 6. The unidirectional-fiber-reinforced material 48 is captured and held in place by the core pins 53 and 54.

Referring now to FIGS. 7 and 10, the mold 50 is operated to its closed condition, subjecting the mold charge to heat and pressure for a curing time on the order of 8 minutes to form the composite wrench, as represented by process block 86. The molding temperature is in the range of 250° to 340° F., and the molding pressure is in the range of 500 psi to 1500 psi. The mold charging as described above together with the shape and size of the mold charge 40 tends to provide a uniform flow pattern in which there are no strong opposing flow fronts which could meet to form a weak knit line.

Referring to FIGS. 8 and 10, in the next step of the process, block 87, at the end of the curing time, the composite wrench 10 is removed from the mold by operating the mold 50 to its open condition and activating the ejector sleeves 56–57 and the ejector bar 58 to eject the composite molded wrench 10 from the mold 50.

Figure 15:
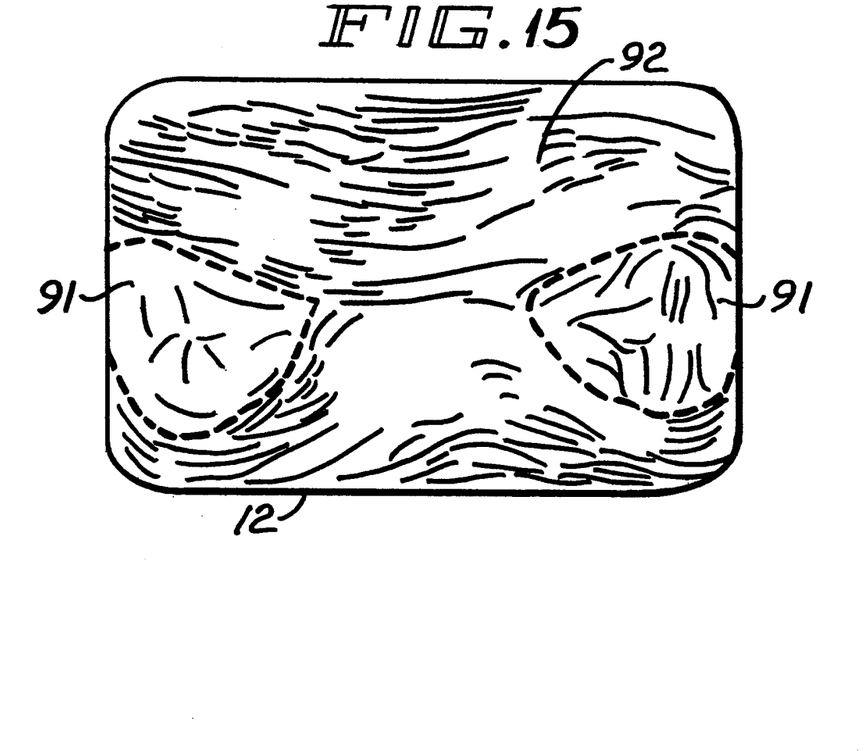
FIG. 15 is a transverse section of the handle of the composite wrench, illustrating the distribution of discontinuous-random and continuous unidirectional-fiber-reinforced materials in the handle.

Referring to FIG. 15, there is illustrated a transverse section of the handle 12 of the composite wrench 10, produced in accordance with the principles of the present invention. The areas 91 within the dashed lines are the regions of the continuous unidirectional-fiber-reinforced material which runs along both outside edges of the handle. The bulk of the handle 12 is formed by the core, indicated generally at 92, which includes the random-fiber-reinforced material. The wrench is a composite unitary structure including the six layers 41–46, shown in FIG. 6, for example, with the regions 91 of continuous unidirectional-fiber-reinforced material integral with the core of random-fiber-reinforced material of the composite structure.

Figure 16:
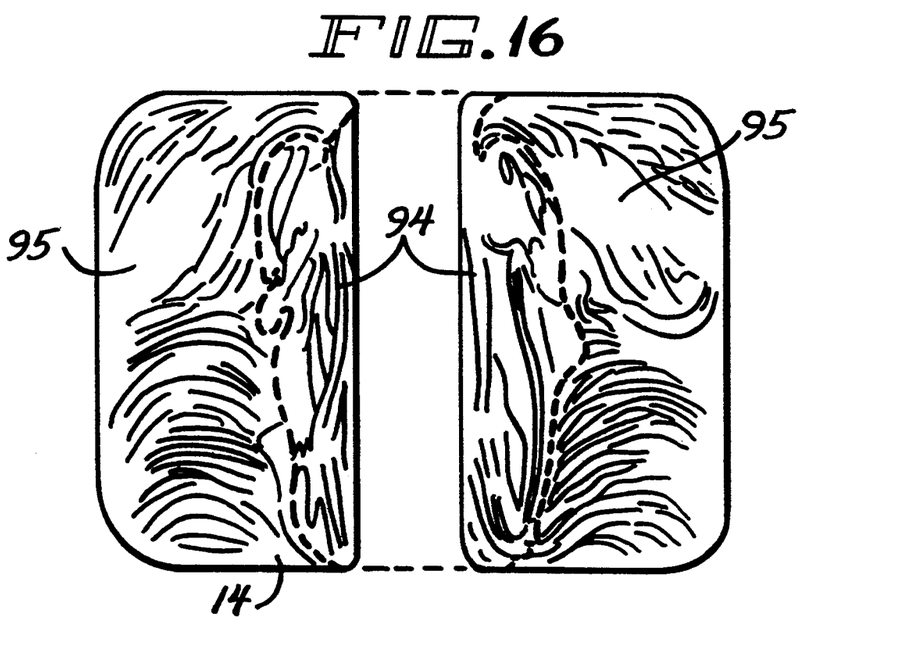
FIG. 16 a transverse section of a box end wall of the composite wrench, illustrating the distribution of discontinuous-random and continuous unidirectional-fiber-reinforced materials in the box end wall.

Referring to FIG. 16, there is illustrated a transverse section of the wall of box end 14 of the composite wrench, illustrating the distribution of discontinuous-random and continuous-unidirectional-fiber-reinforced materials in the box end wall when a band 48 of continuous unidirectional-fiber-reinforced material is positioned in the box-head opening prior to molding, as shown in FIG. 4A. The regions 94 within the dashed lines are the unidirectional-continuous-fiber reinforced material and extend in a vertical band running along the inside wall of the box. During the molding process, the unidirectional-continuous-fiber-reinforced material at both ends flows towards the center of the mold, pulling the band 48 towards the center so that in the end product, the unidirectional-fiber-reinforced material is located along the inside wall of the box. The bulk of the structure, represented by reference numeral 95, is formed of the random discontinuous fiber-reinforced material.

The composite wrench 10 provided by the present invention has dimensions and structural strength which correspond to those for a steel wrench of comparable size. Several ¾ inch composite wrenches produced in accordance with the principles of the present invention was tested and the test results are as follows:

Average Proof Load=79% ANSI Proof (2860 in.lbs.)
Average Ultimate Load=128% ANSI Proof (2860 in.lbs.)

"Proof load" is defined as the minimum load at which any visible damage is observed. ANSI proof is the minimum torque-load requirement of a steel box wrench of the same opening size.

Thus, it has been shown that the present invention provides a composite wrench which is formed entirely of different types of glass-fiber-reinforced plastic material and is produced using a compression molding process. The material used for the core or bulk of the wrench is a random-fiber-reinforced material, preferably a chopped random-oriented glass-fiber-reinforced vinyl ester material, which is particularly suitable for handling multidirectional loading. The wrench further includes a portion which extends around the periphery of the wrench which is made of a unidirectional continuous fiber-reinforced plastic material, preferably a unidirectional continuous glass-fiber-reinforced vinyl ester material which allows for tailoring of local and direct strength and stiffness within the wrench-structure. The unidirectional-fiber-reinforced material, which extends along the entire peripheral edge of the wrench body, is located within the core structure prior to the molding procedure. The compression molding produces a composite wrench structure with the continuous unidirectional-fiber-reinforced material, which forms the strengthening regions in the wrench structure, integral with the random-fiber-reinforced material which forms the bulk of the wrench structure. The composite wrench provided by the present invention has dimensions and structural strength corresponding to those for a steel wrench of comparable size. Additionally, the principles of the invention are applicable to other hand tools, such as open ended wrenches, pliers, drivers, ratchets, sockets, etc.

We claim:

1. A method of making a composite hand tool comprising the steps of preparing a plurality of layers of a random discontinuous glass-fiber-reinforced plastic material having the shape of the outline of the hand tool; stacking the layers together to form a core for the hand tool; placing a band of unidirectional continuous glass-fiber-reinforced plastic material in the core to provide a mold charge; and subjecting the mold charge to heat and pressure in a compression molding apparatus for a predetermined interval of time to form a composite hand tool structure.

2. The method according to claim 1 wherein providing the mold charge includes stacking a first plurality of the layers on top of one another to provide a multilayer stack, placing the band of unidirectional continuous glass-fiber-reinforced plastic material on the top layer of the multilayer stack and extending around the periphery of the multilayer stack, and stacking a second plurality of the layers on top of said first plurality of layers with said band located therebetween.

3. The method according to claim 1 wherein placing the band on the core includes positioning the band between adjacent layers of the core.

4. The method according to claim 1 including wrapping a plurality of strips of unidirectional continuous glass-fiber-reinforced material together to form the band.

5. The method according to claim 1 wherein preparing the layers of random discontinuous glass-fiber-reinforced plastic material includes die cutting the layers in the shape of the outline of the tool from random discontinuous fiber reinforced plastic material stock.

6. The method according to claim 5 which includes die cutting the layers slightly undersize relative to the size of the mold cavity of the compression molding apparatus.

7. The method according to claim 2 including adding a partial layer of the random-fiber-reinforced material to the multilayer stack prior to compression molding to provide sufficient material for a full mold charge weight.

8. The method according to claim 1 including positioning a premolded insert in the mold cavity of the compression molding apparatus and then positioning the mold charge in the mold cavity and around the insert.

9. The method according to claim 1 wherein the plastic material is vinyl ester and wherein the molding temperature is in the range of about 250° to 340° F., and wherein the molding pressure is in the range of about 500 psi to 1500 psi.

10. A method of making a composite wrench comprising cutting a plurality of layers of random discontinuous glass-fiber-reinforced plastic material in the shape of the outline of the wrench; stacking the layers on top of one another to provide a core; placing a band of unidirectional continuous glass-fiber-reinforced plastic on the core and extending the periphery of the core to produce a mold charge; subjecting the mold charge to heat and pressure in a compression molding apparatus for a predetermined interval of time to form a composite wrench structure.

11. The method according to claim 10 wherein placing the band on the core includes positioning the band between adjacent layers of the core.

12. The method according to claim 10 wherein stacking the layers includes adding a partial layer of the random-fiber-reinforced material to the core to provide sufficient material for a full mold charge weight.

13. The method according to claim 10 wherein cutting the layers in the shape of the outline of the wrench includes defining at least one open box-head end for the wrench, and comprising the further step of positioning further unidirectional continuous glass-fiber-reinforced material in the core adjacent to the inner surface of said /pen box-head end.

14. The method according to claim 10 including positioning a premolded insert in the mold cavity of the compression molding apparatus and then positioning the mold charge in the mold cavity and around the insert.

* * * * *